United States Patent [19]

Kato

[11] 4,147,449
[45] Apr. 3, 1979

[54] PROTECTION CONDUIT LINE FOR LAYING UNDERGROUND CABLES

[75] Inventor: Mituyosi Kato, Okazaki, Japan

[73] Assignee: Toyokon Kaihatsu Co., Ltd., Nagoya, Japan

[21] Appl. No.: 836,991

[22] Filed: Sep. 27, 1977

[51] Int. Cl.² ............................ F16L 1/00; E01G 5/00
[52] U.S. Cl. ...................................... 405/154; 405/134; 138/111; 138/117; 285/137 R
[58] Field of Search .................... 61/43, 105; 138/111, 138/112, 105, 117; 285/137 R; 403/263

[56] References Cited

U.S. PATENT DOCUMENTS

| 629,133 | 7/1899 | Knight et al. | 61/43 |
| 833,870 | 10/1906 | Camp | 138/111 |
| 3,901,038 | 8/1975 | Olsen | 61/43 |

FOREIGN PATENT DOCUMENTS

| 8175 | 4/1900 | Norway | 61/43 |
| 143137 | 1/1931 | Switzerland | 61/43 |

*Primary Examiner*—Jacob Shapiro
*Attorney, Agent, or Firm*—Martin A. Farber

[57] ABSTRACT

An underground conduit-forming structure made of concrete for easily forming a protection conduit line for laying underground cables, e.g., power cables, communication cables, etc. For snug coupling between the leading and trailing structures, each structure is provided with a flat bottom, a plurality of through-holes for cables, a receiving surface and a corresponding mating surface, a protuberance and a corresponding fitting hole, operation holes for the coupling operation, joint metals, and a reinforcing bar secured by welding some of these members. A seal member encompassing the through-holes keeps them water-tight when a series of structures are sequentially coupled to form the protection conduit line.

6 Claims, 9 Drawing Figures

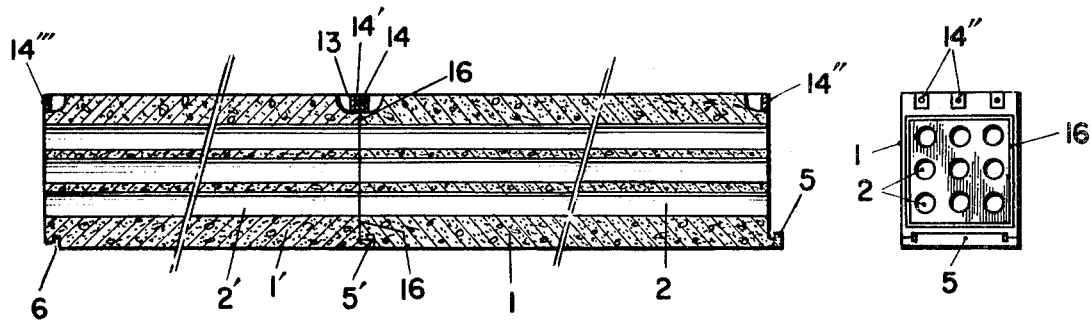
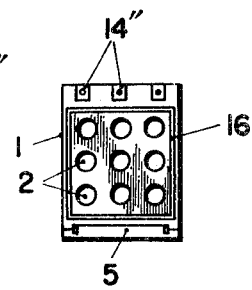
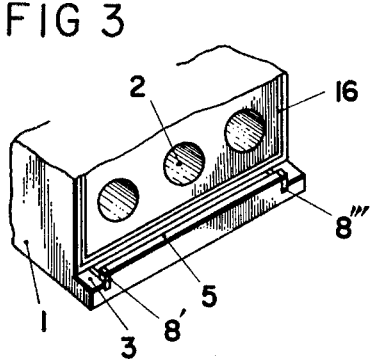
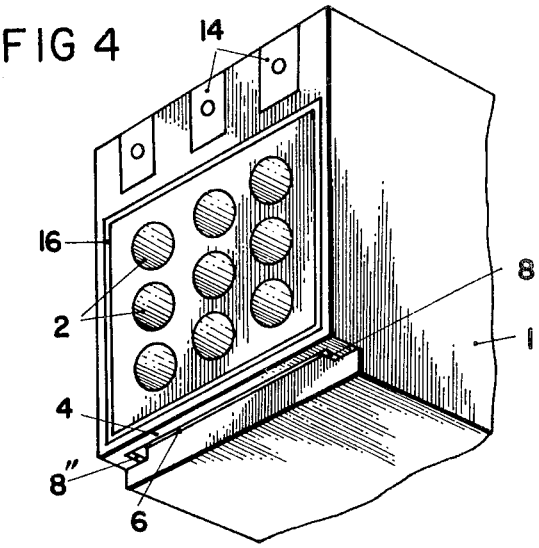
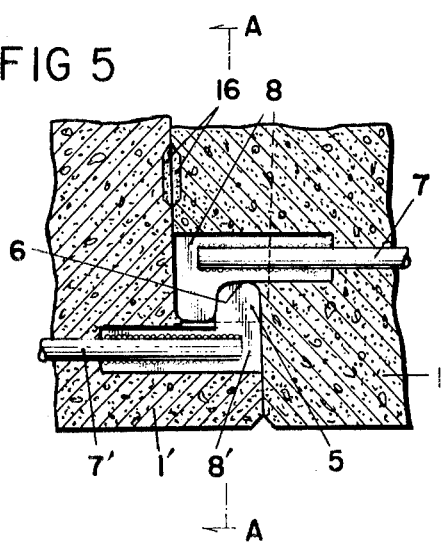
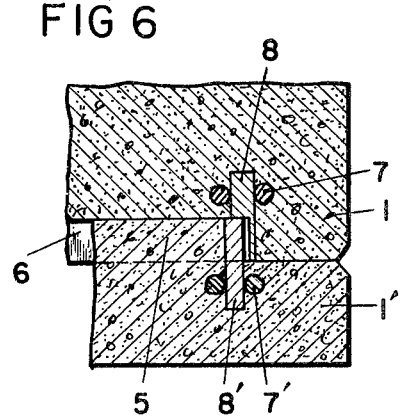

PROTECTION CONDUIT LINE FOR LAYING UNDERGROUND CABLES

For the underground laying of power cable or communication cable, the method conventionally used comprises the steps of spreading cobble stones over the bottom of a ditch after excavation of a road surface, setting a base concrete thereon, resting a pipe incorporating therein matter to be buried such as a cable, for example, at a predetermined position of the ditch after setting of the base concrete, assemblying a mold for concrete to be subsequently set, applying support work to the mold, charging the concrete into the mold and after setting of the concrete, applying the banking to thereby finish the laying operation.

According to this method, however, subsequent steps are always interrupted during setting of the base concrete and the concrete charged into the mold, eventually prolonging the overall work time. Hence, this method tends to enhance traffic jams on roads having heavy traffic as they usually exist at the present and results in an increase in the cost of work.

It is therefore an aspect of the present to provide a protection conduit line which perfectly eliminates the abovementioned problem.

With the above and other objects and advantages in view, the present invention will become more clearly understood in connection with the following detailed description of a preferred embodiment, when considered with the accompanying drawings, of which:

FIG. 1 is a transverse sectional view of a protective conduit line in accordance with the invention;

FIG. 2 is a front view of FIG. 1;

FIG. 3 is a perspective view of the edge section having a receiving surface as viewed from above;

FIG. 4 is a perspective view of the edge section having a mating surface as viewed from below;

FIG. 5 is a transverse sectional view partly broken away of the lower coupling section;

FIG. 6 is a sectional view taken along the line A - A of FIG. 5;

Figure 7:
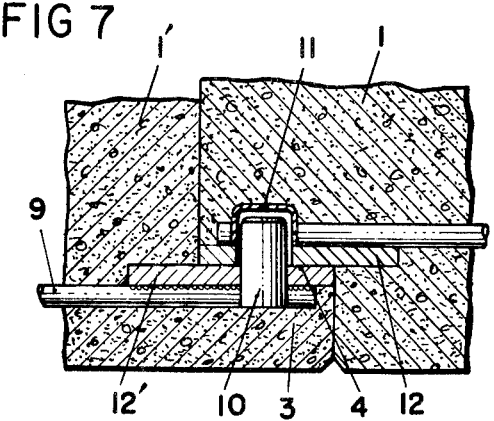
FIG. 7 is a transverse sectional view of another embodiment of the invention.
Figure 8:
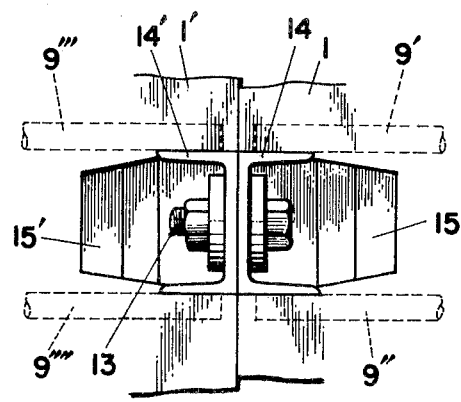
FIG. 8 is a plan view of the upper coupling section.
Figure 9:
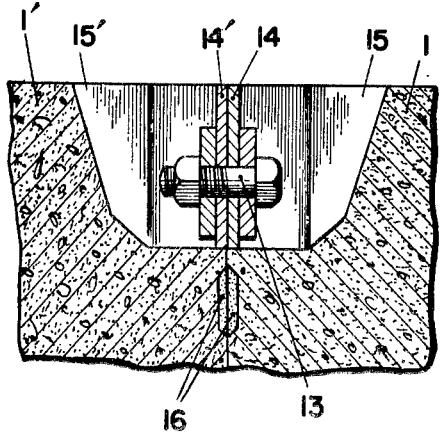
FIG. 9 is a transverse sectional view of FIG. 8.

In accordance with the present invention, an underground conduit-forming structure 1 is provided which is made of concrete and which has a substantially flat bottom. A plurality of through-holes 2 for insertion of cables are formed on the body and to penetrate through its walls at the forward and rear edges. A receiving surface 3 is formed at one of the forward or rear edges of the bottom, e.g. at the forward edge and a mating surface 4 is formed corresponding to the receiving surface at the other forward or rear edges of the bottom, e.g. at the rear edge. A protuberance formed is on either the receiving surface 3 or the mating surface 4. A fitting hole is bored on either the mating surface 4 or the receiving surface 3 correspondingly to the protuberance; both the protuberance and the fitting hole are welded to a reinforcing bar incorporated in the body of the structure. Operation holes 15 are formed at the forward and rear edge of the upper surface of the structure; and a joint metal 14 is disposed inside of each of the operation holes and is welded to the reinforcing bar incorporated in the body of the structure. A plurality of the underground conduit-forming structures 1 which are made of concrete are continuously connected to thereby form a long conduit line by means of the engagement between the protuberance and the fitting hole and the superposition of the receiving surface upon the mating surface 4 at the lower edge and by means of coupling the joint metals 14, 14' at the upper edge, via a sealing member 16 encompassing a group of the through-hole for insertion of cables between adjacent structures 1.

The protection conduit-forming structure made of concrete has a plurality of the through-holes 2 for insertion of cables to penetrate through its front and rear. At the front and rear edges of the bottom of this structure, there are formed the receiving surface 3 acting as a reference projecting in the direction of connection at one edge and the mating surface 4 with the lower surface being cut at the other edge so as to correspond to the receiving surface 3. A protuberance 5 (or pins 10) for engagement is formed on the receiving surface, while a fitting hole 6 (or holes 11) is formed on the mating surface 4 into which the protuberance of an adjacent structure 1 is to be fitted. Reinforcing plates 8' and 8 in part forming the protuberance 5 and the fitting hole 6 are secured by welding to reinforcing bars 7', 7, respectively, incorporated in the abutting structures.

The lower coupling, by means of the protuberance and the fitting hole between adjacent structures 1 and 1', may be effected by engagement between the protrusions 5 and the grooves 6 as shown in FIGS. 3 through 5 or by engagement between pins 10 and pin holes 11 in reinforcement plates 12, 12' as illustrated in FIG. 7.

At the upper forward and rear sections of the structure 1, operation holes 15, 15' are formed in which ⊐-shaped joint metals, 14' are incorporated, respectively. The joint metals (14, 14') are welded, at the sides of their arm portions, to the reinforcing bars (9', 9" and 9'", 9"", respectively) incorporated in the body of the structure so that the upper sections of adjacent structures 1 and 1' are coupled by bolts 13 and nuts via these joint metals 14, 14'. A seal member 16 is annularly disposed at each of the forward and rear edge surfaces of the structures 1, 1' so as to encompass the through-holes 2. When the leading and trailing structures 1 and 1' are coupled, the seal members are tightly pressed, connect the structures 1, 1' water-tight and thus prevent the invasion of water into the through-holes 2, 2'.

The structure 1 is factory-made in advance using a concrete for in-situ assembly and its coupling section also is integrally welded to the reinforcing bar when the bar is disposed in the body of the structure during the production stage.

The construction operation of the protection conduit line is carried out in the following manner. Inside of a ditch for laying the cables, the factory-made structure is coupled to the adjacent structure first at their lower edges by fitting the protuberance of the leading structure into the fitting hole of the trailing structure and superposing the receiving surface 3 of the former on the mating surface 4 of the latter, and then at their upper edges by fastening their joint metals 14, 14' together with bolts 13 and nuts through aligned openings in the central portion of the joint metals 14, 14'. When a required number of structures are sequentially connected in this manner, the protection conduit line is formed having long through-holes 2 that are kept water-tight at their joint sections due to the pressure of the seal members.

After the protection conduit line of the invention is thus constructed, banking is applied and cables are inserted into the through-holes from their start to the end.

As described in the preceeding paragraphs, the conduit-forming structure in the present invention is factory-made in advance and connected with one another in the ditch for laying the cables, which is excavated at the construction site to thereby afford long through-holes for insertion of the cables. In comparison with the in-situ production used conventionally, therefore, the work can be made extremely easily and the work period can be shortened to a marked extent by the present invention. In addition, the present invention is especially effective for roads having heavy traffic as they now are, and leads to savings in the cost of work.

Coupling of the structures 1, 1' is effected by first engaging the lower edges of the structures and then fastening the joint metals 14, 14' at the upper edges by means of bolts, nuts and the like. Hence, work by workers is made only at the upper edge of the structures and can be carried out at a place which is free from obstacles. Since the engagement at the lower edge is made between the receiving surface 3 having the engaging protuberance of the leading structure and the mating surface 4 having the fitting hole of the trailing structure, the coupling of the structures is easily performed by lowering the trailing structure with its rear edge along the forward edge of the leading structure which has already been laid down, whereby the operation of fitting the protuberance 5 into the fitting hole is effected simultaneously with the superposing operation of the mating surface on the receiving surface. Using the engagement at the lower edge as the reference, the alignment of the center of the through-holes 2 of the leading and trailing structures can be easily made, thereby reliably preventing deviation of the structures in all directions and enabling to maintainance of the alignment.

Since the upper edge coupling is then effected under the abovementioned state, the coupling can be accurately and rapidly made. Moreover, the pressure of the seal members a facilitates water-tight coupling between the structures.

In accordance with the present invention, each structure is provided with a flat bottom so that the structure can stably rest on the bottom of the ditch which is excavated at the construction site. In order to align the center of the several through-holes of the leading and trailing structures which have such through-holes, it is absolutely necessary that the trailing structure evenly abut to the leading structure resting stably in the ditch. In this connection, since the structure of the present invention has a flat bottom, any ditch will do so long as it has a flat bottom over its entire length. Accordingly, the excavation of the ditch can be made extremely easily and efficiently without especially paying any attention to the depth and width at specific portions of the ditch as otherwise required.

Furthermore, the flat bottom of the structure is extremely convenient for loading or unloading of the structure to and from a truck during transportation, because the flat bottom can be rolled using proper means.

Each joint metal 14 is furnished with the operation holes 15 at its forward and rear edge surfaces. Even though the metal 14 is arranged so as not to protrude beyond the upper surface, therefore, fastening of bolts and the like can be easily made during the coupling operation. If a motar and the like is grouted into the hole 15 after clamping, the joint section is not exposed to the outside at all, thereby providing a long tubular body having no trace of seams.

The protuberance, the fitting section, and the coupling members for the joint metals 14 are all are welded to the reinforcing bar. For this reason, though the structure 1 itself is made of concrete, the coupling section can be constructed extremely strong with the through-holes being aligned in an accurate manner. The present invention is extremely advantages also in this aspect.

What is claimed is:

1. A protective pipe line for underground cables comprising concrete underground pipe units each having a body portion having front and rear end faces and being formed with a plurality of longitudinal holes extending through said body portion and engageable coupling means formed on said front and rear end faces of said units for connecting said units longitudinally aligned with one another, said holes being adapted to receive cable therethrough, said coupling means including two first coupling means for mutual connection with each other, said two first coupling means being located adjacent a bottom of said end faces of said body portion, one of said two first coupling means forming a receiving surface at one of said end faces, said receiving surface including a first engaging portion projecting upwardly in a direction of connection toward another of said pipe units aligned therewith with said front and said rear end faces of said units, respectively, abutting each other, and the other of said two first coupling means including a mating surface formed at the other end face of said body portion and formed with a second engaging portion substantially complementary to said first engaging portion of said receiving surface, each of said end faces being formed with operation holes at a top of said end faces, said coupling means including two second coupling means for mutual connection with each other, said two second coupling means being mounted at the top of said body portion in said operation holes of said front and rear end faces, respectively, said pipe units being successively joined together in longitudinal alignment by joining said two first coupling means and said two second coupling means, respectively, with one other of aligned said units at the bottom and at the top, respectively, to form a long continuous pipe line.

2. The protective pipe line for underground cables according to claim 1, wherein each said pipe unit is formed with a flat bottom surface at said bottom.

3. The protective pipe line for underground cables according to claim 1, further comprising a seal member disposed on one of said end faces about said longitudinal holes is interposed between adjoining said units surrounding said longitudinal holes for the cable.

4. The protective pipe line for underground cables according to claim 1, wherein said receiving surface at the bottom of said units includes an outwardly projecting upwardly facing step defining two substantially horizontally aligned lateral receiving surfaces, respectively, at lateral sides of said unit, and between said receiving surfaces said first engaging portion constitutes a vertically upwardly projecting protuberance extending to a height higher the level of said lateral receiving surfaces, L-shaped first reinforcement plates each having an upwardly pointing projection terminating at the same height as said protuberance and mounted in said unit between and contiguous to said receiving surfaces and lateral sides of said protuberance, respectively, two reinforcement bars extending through said units at each of the lateral sides thereof, respectively, each of said L-shaped first reinforcement plates is disposed between and welded to said two reinforcement bars, respectively, said mating surface is formed with an inwardly directed downwardly facing step adjacent the bottom of said unit substantially complementary to said receiving surface and defining two substantially horizontal lateral mating surfaces for abutment against said lateral receiving surfaces, respectively, said inwardly directed step being U-shaped and defining therein and between said lateral mating surfaces an upwardly extending groove, said protuberance is removably inserted in said groove in the aligned position of said units, said inwardly directed step has lateral legs, said lateral mating surfaces form downwardly facing portions of said legs, L-shaped second reinforcement plates are laterally disposed against said legs, respectively, of said inwardly directed step and extend in said unit, said second reinforcement plates each have a downwardly projecting portion interlockingly overlappingly engaging said upwardly pointing projection of said L-shaped first reinforcement plates in the aligned position of said units, said L-shaped second reinforcement plates are further L-shaped in a cross-sectional plane lying perpendicularly to the longitudinal direction of said unit, said L-shaped second reinforcement plates abut a portion of a top of said projection of said first reinforcement plates, respectively, as well as laterally abut a lateral outermost side of the latter, said first reinforcement plates are disposed between said second reinforcement plates, said second reinforcement plates have an upper thickened portion of its cross-section disposed between and welded to said two reinforcement bars at said upper thickened portion.

5. The protective pipe line for underground cables according to claim 1, wherein said receiving surface and said mating surface are formed as substantially complementary engaging steps, reinforcement plates horizontally disposed in said units adjacent said steps, respectively, reinforcement bars extend through said units, said reinforcement bars are welded to said plates, respectively, a lowermost of said plates abuts an uppermost of said plates, respectively, in the aligned position of said units, said plates are formed with holes vertically aligned in said aligned position of said units, a pin is disposed through said holes in said plates and constitutes said protuberance.

6. The protective pipe line for underground cables according to claim 1, wherein said second coupling means constitutes U-shaped joint metals having two arms and a central portion and disposed in said operation holes, respectively, at the end faces of said units, said central portions of opposite of said joint metals abut one another in the aligned position of said units and are formed with aligned holes, a bolt extends through said aligned holes and connects said central portions of said joint metals of said units at the top thereof, two longitudinal reinforcement rods mounted through the top of said units, said arms of each of said joint metals are disposed between and welded to said two longitudinal reinforcement rods.

* * * * *